US010317560B2

(12) United States Patent
Tang et al.

(10) Patent No.: US 10,317,560 B2
(45) Date of Patent: Jun. 11, 2019

(54) SYSTEMS AND METHODS OF ROBUST DETERMINATION OF BOUNDARIES

(75) Inventors: Yumei Tang, Tomball, TX (US); Wenshan Yu, Houston, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1131 days.

(21) Appl. No.: 14/344,779

(22) PCT Filed: Sep. 27, 2011

(86) PCT No.: PCT/US2011/053486
§ 371 (c)(1),
(2), (4) Date: Sep. 19, 2014

(87) PCT Pub. No.: WO2013/048375
PCT Pub. Date: Apr. 4, 2013

(65) Prior Publication Data
US 2015/0047902 A1    Feb. 19, 2015

(51) Int. Cl.
*E21B 7/04*    (2006.01)
*G01B 7/06*    (2006.01)
*G01V 3/26*    (2006.01)

(52) U.S. Cl.
CPC .............. *G01V 3/26* (2013.01); *E21B 7/04* (2013.01); *G01B 7/06* (2013.01); *G01B 2210/58* (2013.01)

(58) Field of Classification Search
CPC ............... G01V 3/26; E21B 7/04; G01B 7/06
USPC .......................................................... 703/10
See application file for complete search history.

(56) References Cited

U.S. PATENT DOCUMENTS

| 5,508,616 A | 4/1996 | Sato et al. |
| 6,163,155 A * | 12/2000 | Bittar ................. G01V 3/28 324/338 |
| 6,297,639 B1 | 10/2001 | Clark et al. |
| 6,351,127 B1 | 2/2002 | Rosthal et al. |

(Continued)

FOREIGN PATENT DOCUMENTS

| GB | 2355535 A | 4/2001 |
| WO | WO-2008/115229 A1 | 9/2008 |
| WO | WO-2013048375 A1 | 4/2013 |

OTHER PUBLICATIONS

"International Application Serial No. PCT/US2011/053486, International Preliminary Report on Patentability dated Dec. 6, 2013", 7 pgs.

(Continued)

*Primary Examiner* — Kamini S Shah
*Assistant Examiner* — Iftekhar A Khan
(74) *Attorney, Agent, or Firm* — Gilliam IP PLLC

(57) ABSTRACT

Various embodiments include apparatus and methods to operate a drilling operation relative to formation boundaries. The apparatus and methods can include operating one or more transmitters in a borehole in a formation having a thickness between two boundaries, selecting thickness models based on applying responses from operating the one or more transmitters such that the thickness of the formation is between the two thickness models, and generating a value of a distance to a nearest boundary based on linearization of the thickness models with respect to a long distance investigation parameter and a short distance investigation parameter. Additional apparatus, systems, and methods are disclosed.

29 Claims, 8 Drawing Sheets

(56) References Cited

U.S. PATENT DOCUMENTS

| | | | |
|---|---|---|---|
| 6,393,364 B1* | 5/2002 | Gao | E21B 47/026 324/339 |
| 6,476,609 B1 | 11/2002 | Bittar | |
| 6,493,632 B1* | 12/2002 | Mollison | G01V 3/28 702/2 |
| 6,577,129 B1* | 6/2003 | Thompson | G01V 3/30 324/338 |
| 6,611,762 B1* | 8/2003 | Gao | G01V 3/28 324/339 |
| 6,643,589 B2* | 11/2003 | Zhang | G01V 3/28 702/10 |
| 6,794,875 B2* | 9/2004 | Strickland | G01V 3/28 324/335 |
| 6,906,521 B2* | 6/2005 | Tabarovsky | G01V 3/28 324/334 |
| 6,911,824 B2 | 6/2005 | Bittar | |
| 6,950,749 B2* | 9/2005 | Frenkel | G01V 3/20 324/339 |
| 7,019,528 B2 | 3/2006 | Bittar | |
| 7,138,803 B2 | 11/2006 | Bittar | |
| 7,191,850 B2* | 3/2007 | Williams | E21B 7/04 175/45 |
| 7,265,552 B2 | 9/2007 | Bittar | |
| 7,269,515 B2* | 9/2007 | Tabarovsky | E21B 47/10 702/7 |
| 7,274,991 B2* | 9/2007 | Tabarovsky | G01V 3/28 702/7 |
| 7,333,891 B2* | 2/2008 | Rabinovich | G01V 3/28 702/7 |
| 7,505,851 B2* | 3/2009 | Bal | G01V 3/28 702/7 |
| 7,554,328 B2* | 6/2009 | Wang | G01V 3/28 324/339 |
| 7,557,579 B2 | 7/2009 | Bittar | |
| 7,557,580 B2 | 7/2009 | Bittar | |
| 7,659,722 B2 | 2/2010 | Bittar | |
| 7,737,697 B2* | 6/2010 | Yu | G01V 3/28 324/338 |
| 7,948,238 B2 | 5/2011 | Bittar | |
| 8,060,310 B2* | 11/2011 | Tabarovsky | G01V 3/28 702/11 |
| 8,112,227 B2* | 2/2012 | Rabinovich | G01V 3/28 324/335 |
| 8,354,846 B2* | 1/2013 | Forgang | G01V 3/28 324/339 |
| 8,571,797 B2* | 10/2013 | Wu | G01V 3/38 324/338 |
| 8,875,806 B2* | 11/2014 | Williams | E21B 7/04 175/24 |
| 8,957,683 B2* | 2/2015 | Bittar | G01V 3/30 324/303 |
| 9,364,905 B2* | 6/2016 | Hou | G01V 3/28 |
| 2003/0057950 A1* | 3/2003 | Gao | G01V 3/28 324/339 |
| 2003/0105591 A1* | 6/2003 | Hagiwara | G01V 3/28 702/7 |
| 2003/0229449 A1* | 12/2003 | Merchant | E21B 47/022 702/7 |
| 2004/0019427 A1* | 1/2004 | San Martin | G01V 3/28 702/6 |
| 2004/0154831 A1* | 8/2004 | Seydoux | E21B 7/04 175/24 |
| 2004/0183538 A1* | 9/2004 | Hanstein | G01V 3/28 324/339 |
| 2006/0011385 A1* | 1/2006 | Seydoux | G01V 3/28 175/61 |
| 2007/0150200 A1* | 6/2007 | Charara | G01V 3/265 702/6 |
| 2007/0168133 A1* | 7/2007 | Bennett | E21B 49/00 702/6 |
| 2007/0235225 A1 | 10/2007 | Bittar | |
| 2007/0236222 A1* | 10/2007 | Gorek | G01V 3/22 324/356 |
| 2007/0285274 A1 | 12/2007 | Esmersoy | |
| 2009/0230968 A1 | 9/2009 | Bittar et al. | |
| 2009/0302851 A1* | 12/2009 | Bittar | E21B 47/026 324/338 |
| 2010/0007348 A1* | 1/2010 | Fang | G01V 3/28 324/339 |
| 2010/0030477 A1* | 2/2010 | Yang | G01V 3/30 702/9 |
| 2010/0179762 A1* | 7/2010 | Tabarovsky | G01V 3/28 702/7 |
| 2013/0073206 A1* | 3/2013 | Hou | G01V 3/28 702/7 |
| 2013/0226461 A1* | 8/2013 | Yu | G01V 3/24 702/9 |
| 2014/0368197 A1* | 12/2014 | Wang | G01V 3/12 324/333 |
| 2015/0047902 A1* | 2/2015 | Tang | G01V 3/26 175/45 |
| 2016/0282503 A1* | 9/2016 | Hou | G01V 3/38 |

OTHER PUBLICATIONS

"International Application Serial No. PCT/US2011/053486, Search Report dated Sep. 10, 2012", 3 pgs.

"International Application Serial No. PCT/US2011/053486, Written Opinion dated Sep. 10, 2012", 5 pgs.

"International Application Serial No. PCT/US2011/053486, Written Opinion dated Sep. 13, 2013", 6 pgs.

"European Application Serial No. 11767127.1, Office Action dated Apr. 2, 2014", 2 pgs.

"European Application Serial No. 11767127.1, Response filed Sep. 5, 2014 to Office Action dated Apr. 2, 2014", 9 pgs.

"Gulf Cooperation Council Application Serial No. 2012/22349, Office Action dated Jan. 12, 2015", 4 pgs.

"International Application Serial No. PCT/US2011/053486, Response filed Jul. 23, 2013 to Written Opinion dated Sep. 10, 2012", 6 pgs.

"Gulf Cooperation Council Application Serial No. 2012-22349, Second Examination Report dated Jan. 19, 2017", 4 pages.

"EP Application No. 11,767,127.1-1559, Examination Report, dated Jul. 18, 2017".

\* cited by examiner

SYSTEMS AND METHODS OF ROBUST DETERMINATION OF BOUNDARIES

This application is a U.S. National Stage Filing under 35 U.S.C. 371 from International Application No. PCT/US2011/053486, filed on 27 Sep. 2011, and published as WO 2013/048375 A1 on 4 Apr. 2013; which application and publication are incorporated herein by reference in its entirety.

TECHNICAL FIELD

The present invention relates generally to apparatus for making measurements related to oil and gas exploration.

BACKGROUND

In drilling wells for oil and gas exploration, understanding the structure and properties of the associated geological formation provides information to aid such exploration. Optimal placement of a well in a hydrocarbon-bearing zone (the "payzone") usually requires geosteering with deviated or horizontal well trajectories, since most payzones extend in the horizontal plane. Geosteering is an intentional control to adjust drilling direction. An existing approach based on geosteering in well placement includes intersecting and locating the payzone followed by moving the drill string to a higher position and beginning to drill a new branch that approaches to the target zone from top. This first approach is time consuming, where drilling needs to be stopped and a device for branching needs to be lowered into the well. Another existing approach based on geosteering in well placement includes intersecting and locating the payzone followed by continuing drilling to approach the well from the bottom. This second approach can result in overshoot of the well path from the desired target zone and may only be effective if the well is highly deviated at point of intersection.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
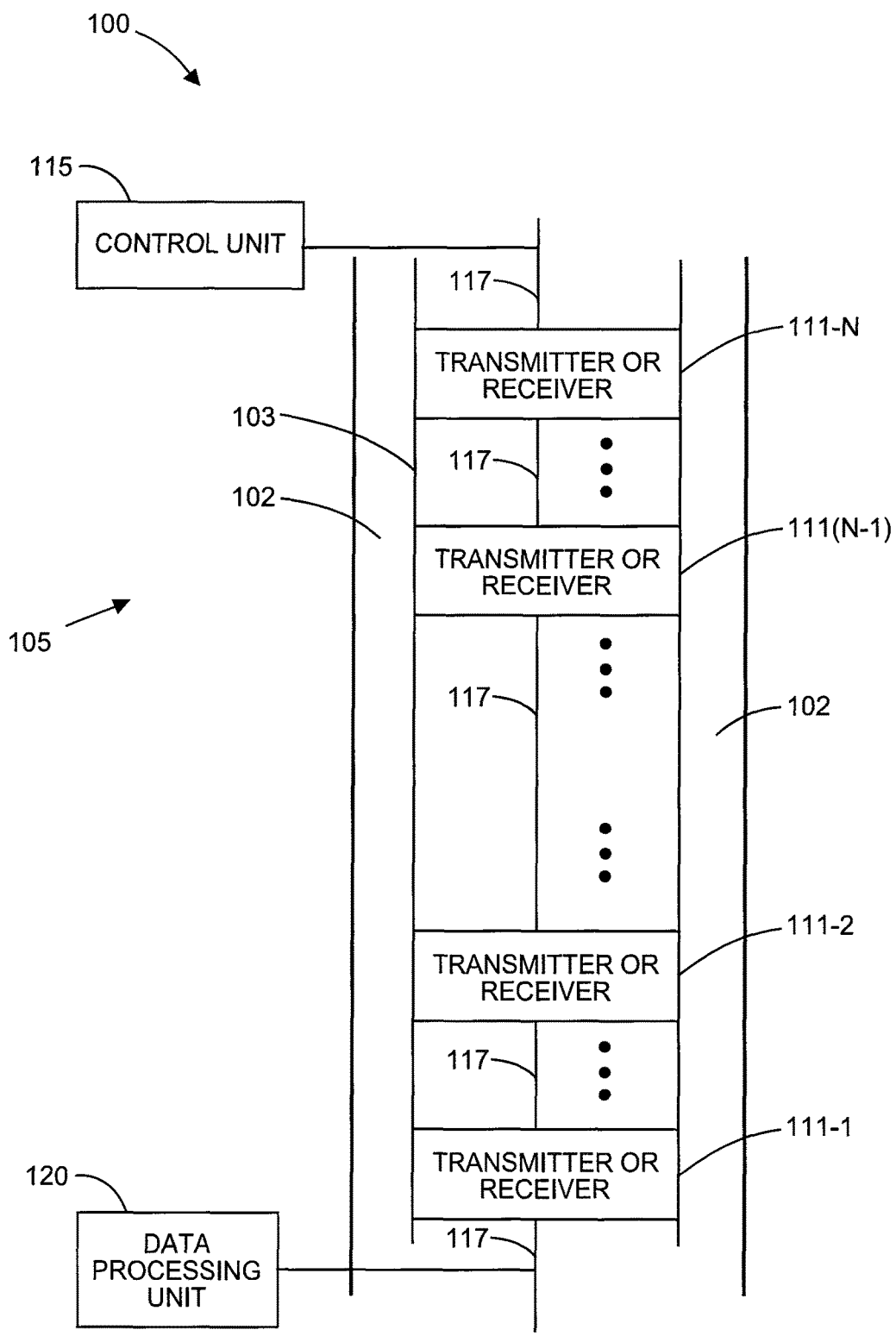
FIG. 1 shows a block diagram of an example system to determine a boundary location of a formation with respect to a drilling operation, in accordance with various embodiments.

FIG. 1 shows a block diagram of an example embodiment of a system 100 structured to determine a boundary location of a formation with respect to a drilling operation. System 100 includes a tool 105 having a tool structure 103, a control unit 115, and a data processing unit 120. Tool structure 103 has an arrangement of sensors 111-1, 111-2 ... 111-(N-1), 111-N along a longitudinal axis 117 of tool structure 103. Each sensor 111-1, 111-2 ... 111-(N-1), 111-N can be utilized as a transmitting sensor or a receiving sensor under the control of control unit 115. Control unit 115 can be operable to manage generation of a probe signal from one or more transmitter sensors in the arrangement of sensors 111-1, 111-2 ... 111-(N-1), 111-N and to manage collection of received signals at the receiver sensors in the arrangement of sensors 111-1, 111-2 ... 111-(N-1), 111-N. Control unit 115 can be operable to select one or more transmitter sensors from among the sensors in the arrangement of sensors 111-1, 111-2 ... 111-(N-1), 111-N and to select one or more receiver sensors from among the sensors in the arrangement of sensors 111-1, 111-2 ... 111-(N-1), 111-N such that operation of the selected transmitter sensors and receiver sensors can be conducted according to a long distance investigation parameter and a short distance investigation parameter. Data processing unit 120 of system 100 can be structured to process the received signals to determine a distance to the nearest boundary and a thickness value between the two boundaries.

Control unit 115, which manages the generation of transmission signals and which can manage the collection of received signals corresponding to the transmission signals, can conduct the generation of transmission signals to provide signals corresponding to different spacings for transmitter-receiver pairs. Signals can be generated at different frequencies. The spacing between transmitter and receiver in one pair that is larger than the spacing between transmitter and receiver in another pair provides a longer distance of investigation than the transmitter-receiver pair having a shorter spacing. Alternatively to long distance and short distance parameters corresponding to spacing between transmitters and receivers, such parameters can correspond to operating frequencies of the transmitters and receivers. Operating at low frequencies provides investigation at longer distances than operating at higher frequencies. The collected received signals can be provided to data processing unit 120 in appropriate format to perform linearization on thickness models using the collected received signals. Tool 105 can be structured with data processing unit 120 and control unit 115 integrated with tool structure 103 or structured as distributed components.

Figure 2:
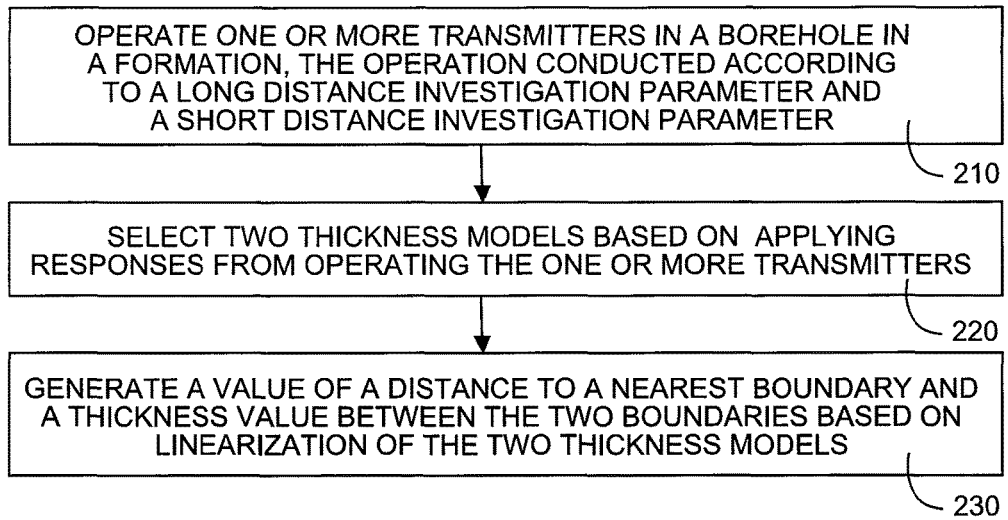
FIG. 2 shows features of an example method of determination of a boundary location of a formation, in accordance with various embodiments.

FIG. 2 shows features of an example embodiment of a method of determination of a boundary location of a formation. At 210, one or more transmitters are operated in a borehole in the formation relative to two boundaries of the formation. The distance between the two boundaries provides a thickness of the formation. The operation of the transmitters can be conducted according to a long distance investigation parameter and a short distance investigation parameter. The one or more transmitters can be operated at a first operating frequency and at a second operation frequency such that operating at the first operating frequency generates a long distance of investigation relative to a distance of investigation of operating at the second operation frequency. Operating one or more transmitters can include operating transmitter-receiver pairs, where each transmitter-receiver pair has a spacing between the transmitter and the receiver of the respective pair such that at least two transmitter-receiver pairs have different spacings.

At 220, two thickness models can be selected based on applying responses from operating the one or more transmitters. The two thickness models can be selected such that the thickness of the formation is between the two thickness models. The two thickness models can be selected from a set of more than two thickness models using vertical distances derived from the responses and mapping the vertical distances between thickness models on a pairwise basis with respect to the long distance investigation parameter and the short distance investigation parameter. Selecting two thickness models based on applying responses from operating the one or more transmitters can include using geo-attenuation data from operating the one or more transmitters. Selecting two thickness models based on applying responses from operating the one or more transmitters can include using geo-phase data from operating the one or more transmitters.

At 230, a value of a distance to the nearest boundary and a thickness value between the two boundaries can be generated based on linearization of the two thickness models. The linearization can be conducted with respect to the long distance investigation parameter and the short distance investigation parameter. Generating the value of the distance to a nearest boundary can include generating a first linear relationship between the formation models for the long distance investigation parameter, generating a second linear relationship between the formation models for the short distance investigation parameter, and generating the value of the distance to the nearest boundary and the thickness value between the two boundaries from an intersection of the first linear relationship and the second linear relationship. The one or more transmitters and electronics can be disposed on a logging while drilling tool, where the one or more transmitters and electronics can be operated with the electronics arranged to select the two thickness models based on applying responses from operating the one or more transmitters and to generate the value of the distance to a nearest boundary and a thickness. Alternatively, the electronics to evaluate the response from operating the one or more transmitters can be located at the surface of the drilling operation. Geosteering a drilling operation can be conducted based on the generated value from the linearization.

In an embodiment, a method of determination of a boundary location of a formation relative to a drilling operation can include operating at least two transmitter-receiver pairs on a tool, where at least two of the transmitter-receiver pairs have different spacings from each other. Response curves can be generated for two or more formation models of different thicknesses. Selected responses from operating the one or more transmitters can be mapped to the response curves. A vertical distance for a long spacing can be generated for each model thickness and a vertical distance for a short spacing can be generated for each model thickness. Two models can be determined corresponding to two different selected spacings such that the thickness of the formation layer is between the thicknesses of the two models. The two different selected spacings can be referred to as being a selected first spacing and a selected second spacing. A first line can be generated by a vertical distance for the selected first spacing of one of the two models and a vertical distance for the selected first spacing of the other one of the two models. A second line can be generated by a vertical distance for the selected second spacing of one of the two models and a vertical distance for the selected second spacing of the other one of the two models. A cross point of the first line with the second line can be calculated. The value of the distance to the nearest boundary and the thickness value of the formation can be generated from coordinates of the cross point.

In various embodiments, directional logging-while-drilling (LWD) measurements can be used to provide a straightforward calculation procedure to determine a distance to bed boundaries (DTBB). These procedures can identify distances to upper and lower bed boundaries effectively in real time without use of a common iterate inversion method. The estimation of DTBB can be used as an indication of the geosteering direction to control the drilling direction. Apparatus performing these calculations can be embedded in a logging tool to realize real-time bed boundary detection in a borehole.

In the field of petroleum wireline logging and logging-while-drilling, electromagnetic resistivity tools have been widely used to explore the subsurface based on the electrical resistivity (or its inverse, conductivity) of the rock formation. The formation with a higher resistivity implicates a higher possibility of hydrocarbon accumulations. A typical resistivity tool is comprised of one or more antennas that operate as transmitters and receivers. The transmitter antenna can employ alternating currents to generate an electromagnetic field, which can induce eddy currents around the surrounding conductive formation. The eddy currents can generate a magnetic field, which will be detected by the receiver antenna. The transmitter can be operated to transmit signals at different frequencies. For two spaced-apart receivers operated with a transmitter, a received signal has a phase and amplitude difference between the two receivers. The measurements respect to multi-frequency and multi-spacing can provide some versatility to formation detection. The sensitive range is affected by the formation and the tool's structure.

In a formation coordination system, the x-y plane can be taken to be parallel to the formation layer and the z axis can be taken perpendicular to the formation layer. Horizontal resistivity, $R_h$, is the resistivity in a direction of x-y plane. Vertical resistivity, $R_v$, is the resistivity in z axis direction.

An electrically isotropic formation has the same horizontal resistivity and vertical resistivity, while an anisotropic formation has a different $R_h$ and $R_v$. The relative dip angle is the angle between the tool axis and the normal of the formation x-y plane. Anisotropy, dip angle, and distances to boundaries have significant effects on resistive logging measurement. As a result, resistivity logging systems may account for formation anisotropy, dip angle, and boundary position in order to obtain accurate formation resistivity.

Data processing techniques used with a directed logging tool can be used to generate formation parameters. To obtain more accurate formation parameters, an inversion procedure can be used, where inversion is a process of searching for optimum match between simulated data and measurements. The simulated data can be generated with assumptions of formation parameters and can include horizontal resistivity, vertical resistivity, dip angle, and boundary position. Since the location of the current logging point is important for making an on-site drilling decision, a relatively fast, real-time estimation of distance to a boundary enhances capabilities for geosteering. In various embodiments, DTBB calculation with directional LWD resistivity measurements can be provided to substitute for the common iteration inversion method. This methodology for DTBB calculation can be embedded in a logging tool to attain real-time resistivity and bed boundary detection in a borehole.

Figure 3:
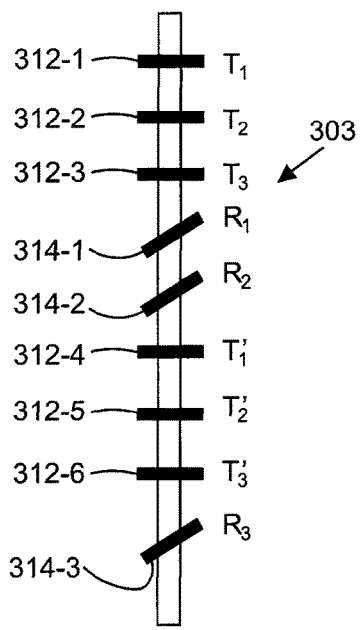
FIG. 3 shows an example directional resistivity tool that can be used to make measurements, which can be used in real-time calculations of distance to bed boundaries, in accordance with various embodiments.

FIG. 3 shows an example of an embodiment of a directional resistivity tool structure 303, which can be used to make measurements that can be used in real-time DTBB calculations. As shown in FIG. 3, an example directional resistivity tool 303, arranged as a logging tool, can be structured with three transmitter antennas 312-1, 312-2, and 312-3 separated from another set of three transmitter antennas 312-4, 312-5, and 312-6 by two tilted receivers 314-1 and 314-2. Directional resistivity tool structure 303 can also be structured with N tilted or coaxial transmitter antennas $T_1, T_2, T_3, \ldots, T_N$ spaced along the tool. A directional resistivity tool having N transmitters can also include tiled or coaxial receiver antennas $R_1$ and $R_2$ that are axially spaced apart from the transmitter antennas and from each other. After the resistivity tool structure 303 has been placed in a borehole and drilling commences, tool structure 303 can be operated to begin to rotate and to collect receiver measurements excited by multi-spacing and multi-frequency current source transmitters. Measurement along the 360 degrees of rotation can be attained, while tool structure 303 rotates at the same position in the borehole. Measurements over the 360 degrees can be divided into 32 bins and each bin covers 11.25 degree. The number of bins can be less than or more than 32 bins. A first bin, labeled bin 1, can be correlated with the measurement in the upper right direction perpendicular to the axis of tool structure 303. For 32 bins, bin 17 is assigned to the reverse (opposite) direction of bin 1. In measurements, bin shift can be determined by the sinuous curve fitting for the data in these 32 bins. In addition, compensated measurements can be calculated for a symmetric structure of tool structure 303 configured in a logging arrangement. Measurements with respect to different frequencies and different spacings between transmitter-receiver pairs have different sensitivities to formation parameters and different detection ability even for the same parameter.

With the directed tool structure design, operating frequency and transmitter-receiver spacing may be varied as desired to provide deep or shallow depth of investigation, spatial resolution, or signal to noise ratio. In general, the long spacing tool performs deep measurements for bed boundary and shoulder resistivity, while measurements of a short length tool can provide accurate information of local area. Operating at lower frequencies provides for deeper depth of investigation than operating at higher frequencies.

Tool structure 303, as shown in FIG. 3, can have three symmetric coaxial transmitter antennas $T_1$-$T_1'$, $T_2$-$T_2'$ and $T_3$-$T_3'$ spaced along the tool with 16, 32, and 48 inch spacing to the center of two receivers $R_1$ and $R_2$. Other spacings can be used. Receivers $R_1$ and $R_2$ in illustrative logging tool structure 303 can be realized as tilted receiver antennas that are axially spaced apart from the transmitter antennas and from each other with 4 inch spacing length. Other receiver spacings can be used. In addition, a receiver antenna 314-3, labeled $R_3$, can be located at a 64 inch position. Other remote receiver antennas can be located at other positions. These receivers can be tilted at 45 degrees with respect to the longitudinal axis of tool structure 303.

Since the response of the tilted antennas is azimuthally sensitive, the resistivity measurements can be determined from the average compensated amplitude and phase measurement of the current bin. The resistivity measurements may be determined from the average compensated amplitude and phase measurement of the current bin in combination with the average compensated measurements for other nearby bins and other measured or estimated formation parameters such as formation strike, dip, and anisotropy. The compensated measurements can be determined by averaging measurements resulting from symmetrically spaced transmitters. The compensated amplitude ratios can be determined using the following equations:

$$\alpha_{T1} = \ln(A_{R1T1}) - \ln(A_{R2T1}) \quad (1)$$

$$\alpha_{T1'} = \ln(A_{R1T1'}) - \ln(A_{R2T1'}) \quad (2)$$

$$\alpha_c = (\alpha_{T1} + \alpha_{T1'})/2 \quad (3)$$

where, for example, $A_{R1T1}$ is the amplitude of the signal received by receiver $R_1$ in response to a signal transmitted by transmitter $T_1$. Other symbols have similar definitions. The compensated phase difference can be calculated in a manner similar to that of the amplitude ratio. The average compensated amplitude and phase measurements from azimuthally spaced and axially spaced bins may also be included in the resistivity calculation to account for the effects of anisotropic, dipping formations. Conventional look-up table or forward modeling techniques may be used to determine the resistivity measurement. The resistivity can be converted with the amplitude or phase measurement.

A geosignal calculated for a bin can be used as a bed boundary indicator. An example of a geosignal calculation function can include a function that takes the difference between phase or log amplitude for the current bin and the average phase or log amplitude for all the bins at a given axial position in the borehole:

$$I_{R1T1} = \ln(A_{R1T1}(k)) - \frac{1}{n}\sum_{i=1,n} \ln(A_{R1T1}(i)) \quad (4)$$

where $A_{R1T1}(k)$ is for the bin at the $k^{th}$ rotational position in the borehole. The geosignal phase can be calculated with the same function. The compensated geosignal can be generated as the average of the four geosignals of two receivers excited by two symmetric transmitters. The resistivity log and bed boundary indicator may be displayed as a function of tool position and azimuthal orientation while logging and drilling operations are ongoing, enabling a user to steer the drilling assembly with the benefit of this information. Alternatively, measured data can be used in electronics to autonomously steer the drilling assembly.

In a three layer model, the geosignal is zero when the effects of two boundaries are equal, cancelling out each other. Typically, the longer spacing tool is affected by a boundary before the shorter tool receives the effect of boundary. An estimation of two boundaries can be attained by mapping raw measurements of long and short spacing responses. An estimation of two boundaries may be attained by mapping raw measurements of responses to long depth investigations and responses to short depth investigations. Relative long depth investigations with respect to short depth investigations can be attained by operating at different frequencies.

Figure 4:
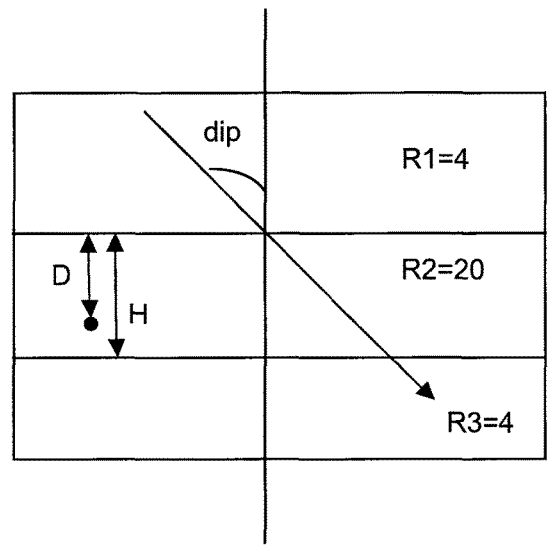
FIG. 4 shows a formation model with three layers to which a tool having a linearization procedure can be applied, in accordance with various embodiments.

FIG. 4 shows a formation model with three layers to which a tool having a linearization procedure can be applied. In this example three-layer formation, the resistivities of the layers are 4 ohm-m, 20 ohm-m, and 4 ohm-m. A tool, having tool structure 303 of FIG. 3 or other appropriate structure, passes through the middle layer with 80° dip angle, where two transmitter-receiver pairs of the tool are considered, in which one transmitter-receiver pair has a 32 inch transmitter-receiver spacing and the other transmitter-receiver pair has a 96 inch transmitter-receiver spacing. The working frequency for the 32 inch transmitter-receiver spacing and the 96 inch transmitter-receiver spacing in this model is 500 kHz.

Figure 5A:
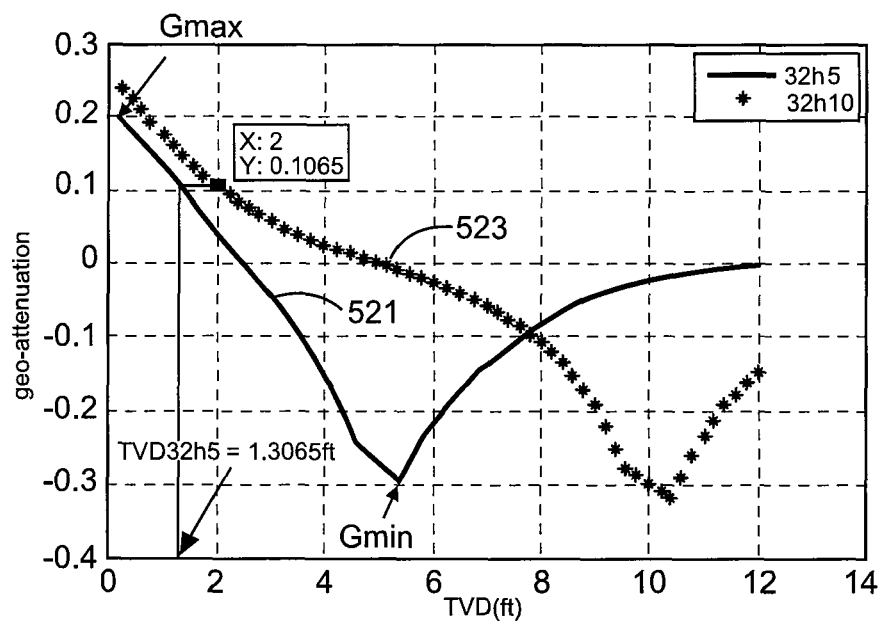
FIGS. 5A and 5B show geo-attenuation curves for two different spacings between transmitter and receiver relative to the same two values of formation thickness, in accordance with various embodiments.
Figure 5B:
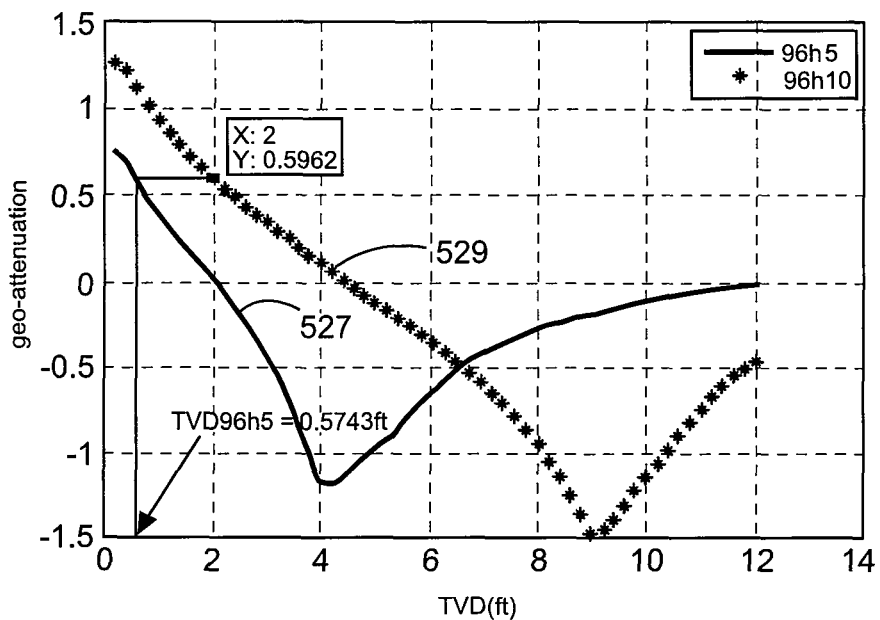

FIGS. 5A and 5B show geo-attenuation curves for two different spacings between transmitter and receiver relative to the same two values of formation thickness. FIG. 5A shows a geo-attenuation curve 521 for a 32 inch tool at 5 ft thickness and a geo-attenuation curve 523 for a 32 inch tool at 10 ft thickness. The first bin, taken for the measurement in the upper right direction perpendicular to the axis of the logging tool, is considered in the following discussion, which can be extended to other rotating measurements. The X-axis is the true vertical depth of the logging point starting at the upper boundary proceeding to the lower boundary of the middle layer. The Y-axis presents the geo-attenuation of the measurements from equation (1). Two curves monotonically decrease inside of the middle layer with 20 ohm-m resistivity and the response attains zero around the middle of the layers. The tool drilling towards true vertical depth (TVD) in increasing direction starts to receive responses when approaching the upper boundary, where peak responses are attained around the boundary area. The responses drop to zero in the middle of the layer because of the cancellation effect from the upper and lower boundary.

With the first boundary as zero with respect to TVD in the simulated model in FIG. 5A, the distance to the upper boundary is equal to the current TVD. The distance to the lower boundary can be calculated with the layer thickness and the current TVD. One sample measurement (geo-attenuation of 0.1065) at 2.0 ft of the 10 ft layer for a 32 inch tool is mapped on the respective curve 521 of the 5 ft model for the 32 inch tool. For the response value (geo-attenuation of 0.1065) of the 32 inch tool in the 10 ft layer, mapping this same response (0.1065) of the 32 inch tool from the 10 ft layer model to the 5 ft layer model of the 32 inch tool yields a TVD of 1.3065 ft, as shown in FIG. 5A.

FIG. 5B shows two geo-attenuation curves for a 96 inch tool in same formation as the example of FIG. 5A. Geo-attenuation curve 527 corresponds to the 96 inch tool at 5 ft thickness and geo-attenuation curve 529 corresponds to the 96 inch tool at 10 ft thickness. The TVD mapping from the 96 inch tool in the 5 ft layer model is (0.5743 ft) for the sample point in the 10 ft layer. The TVD (1.3065 ft) from mapping of the 32 inch tool is greater than the TVD (0.5743 ft) from mapping of 96 inch tool when the mapping layer is 5 ft.

Figure 6A:
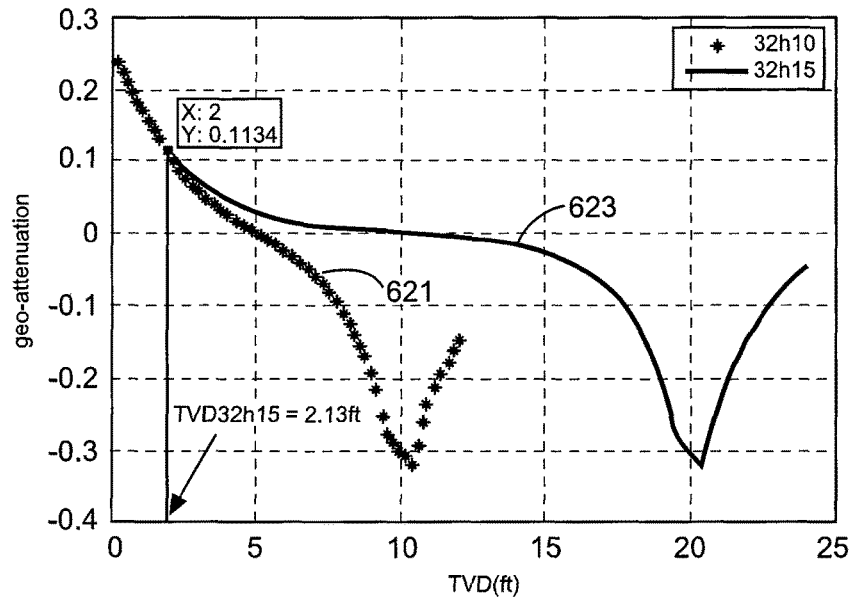
FIGS. 6A and 6B show geo-attenuation curves for two different spacings between transmitter and receiver relative to the same two values of formation thickness, in accordance with various embodiments.
Figure 6B:
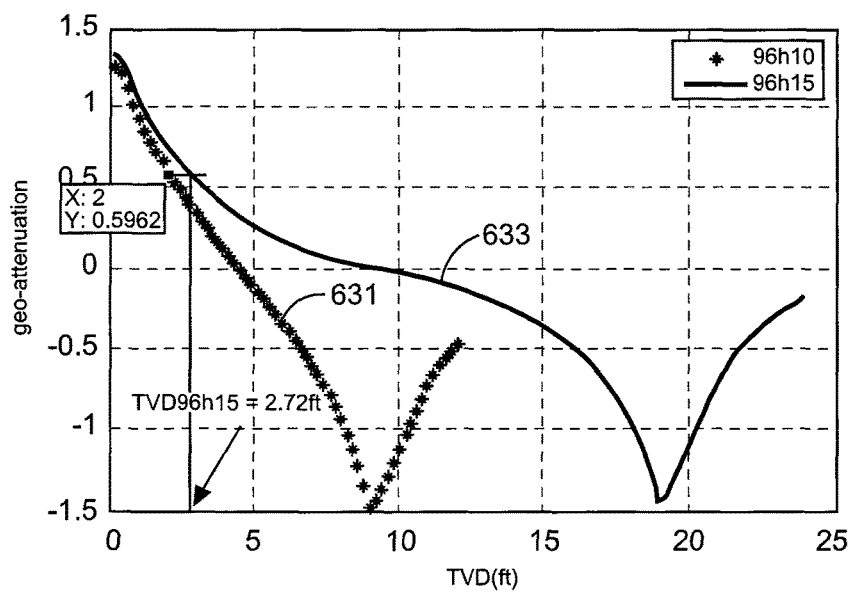

FIGS. 6A and 6B show geo-attenuation curves for two different spacings between transmitter and receiver relative to the same two values of formation thickness. FIG. 6A shows a geo-attenuation curve 621 for a 32 inch tool at 10 ft thickness and a geo-attenuation curve 623 for the 32 inch tool at 15 ft thickness. FIG. 6B shows a geo-attenuation curve 631 for a 96 inch tool at 10 ft thickness and a geo-attenuation curve 633 for the 96 inch tool at 15 ft thickness. A mapping procedure, similar to the procedure above with respect to FIGS. 5A and 5B, can be conducted in the 15 ft thickness layer model for the same sample point as in the 10 ft layer model, where the mapping results are shown in FIGS. 6A and 6B. The mapped TVDs from the 32 inch and 96 inch tools in the 15 ft layer model are respectively 2.13 ft and 2.72 ft with the same responses in 10 ft layer. The mapped TVD of the 32 inch tool is less than the mapped TVD of the 96 inch tool when the mapping layer is the 15 ft model for the same measurement of 2 ft. The true values of the distances to the upper and lower boundaries should be inside of the mapped TVDs and thicknesses.

Figure 7:
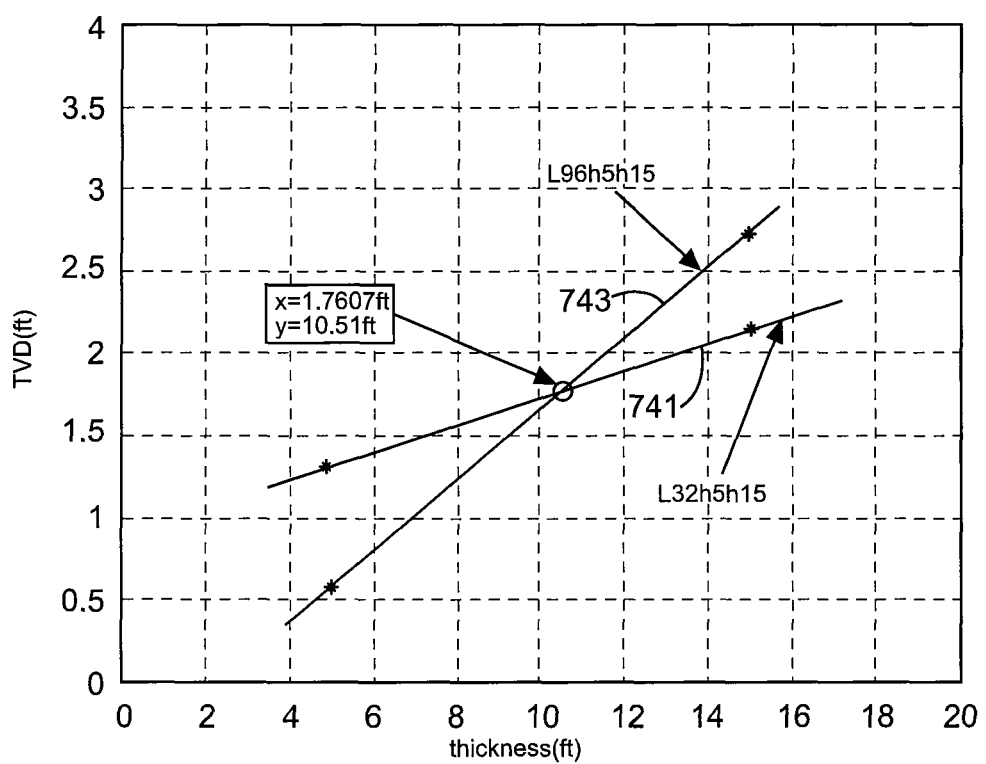
FIG. 7 shows two lines generated relative to two formation models to attain distances to upper and lower formation boundaries, in accordance with various embodiments.

FIG. 7 shows four mapped TVDs in two models from FIGS. 5A-5B and 6A-6B. The four mapped TVDs are presented in two lines 741 and 743. One line 743 is provided for a 96 inch tool in a 5 ft layer model and a 15 ft layer model. Another line 741 is provided for a 32 inch tool in the 5 ft layer model and the 15 ft layer model. The coordinators of the cross point of the two lines 741 and 743 are (1.77 ft, 10.5 ft). The cross point in FIG. 7 is an estimation of the distance to the upper boundary (1.77 ft) and the thickness (10.5 ft) of the current layer. A difference between true value and calculation can stem from this procedure being a linear approximation. This method can provide a good estimation of the thickness of the layer, which can avoid local optimized inversion.

An estimate of the thickness of a layer can be attained from the measurement with stronger effect from the upper layer. If the TVD from a long investigation depth (TVD_long) is larger than the TVD from a short investigation depth (TVD_short) in one model, the true thickness of layer is thinner than the model. Otherwise, if TVD_long is smaller than TVD_short in one model, the true thickness of the layer is larger than the model. When the tool is closest to the lower boundary, the rule is inverted. If TVD_long is less than TVD_short in one model, the true thickness of layer is thinner than the model. Otherwise, if TVD long is greater than TVD_short in one model, the true thickness of layer is larger than the model.

In field applications, simulation with guessed models and mapping with raw measurements are made first. Based on the above procedure to determine the true vertical distance and layer thickness, a rule may be used in the procedure such that the true thickness of the layer should lay inside of the two guessed formation models. In other words, when the geosignal is the same, TVD_Htrue for the true layer should be less than TVD_H1 and larger than TVD_H2, where H1<Htrue<H2. This procedure can be simplified as finding two models that satisfy this following function:

$$(TVDL\_H1 - TVDS\_H1) * (TVDL\_H2 - TVDS\_H2) < 0 \qquad (5)$$

where TVDL_H1 means the mapped TVD for deep investigation depth, for example long spacing between transmitter and receiver, in H1 thinner thickness model and TVDS_H2 means mapped TVD for short or shallow investigation depth, for example short spacing between transmitter and receiver, in H2 thicker model. If the signs of the TVD difference of two spacing measurements in the two models are inversed, the thickness of the true formation is inside of the thicknesses of the two models. Thus, the linear estimation can be built up with the bed thickness and TVD to find the two distances to boundaries from a given location. The distance to boundary could be calculated from the true TVD and bed thickness.

When the tool is close to the boundary, the mapping TVD in the thinner model cannot be found because the true measurement is always larger than the respective response at any position in the thinner layer formation model. For example, as shown in FIG. 5A, no value could satisfy both of the 5 ft model and the 10 ft model when the real response is larger than the Gmax. In other words, no response in the 5 ft thickness model is equal to the value in the 10 ft thickness model when the logging point is at 0.1 ft to the upper boundary for 32 inch tool. Similarly, no value that is less than Gmin could be found when the tool is extremely close to the lower boundary. In these two extreme cases, approximation can be made to generate the TVD mapping, where G is the real field response:

when G>Gmax (maximum of a geo-attenuation response), TVDS_H2 is close to the upper boundary:

$TVDS\_H1=TVDS\_H2$ $TVDL\_H1=0.0$ when G<Gmin (minimum of a geo-attenuation response), TVDS_H2 is close to the lower boundary:

$TVDS\_H1=H1$ $TVDL\_H1=TVDL\_H2$ where TVDL_H1 means mapping TVD for deep investigation depth, which can be a long spacing of a transmitter-receiver pair relative to a shorter spacing of another transmitter-receiver pair or can be attained operating at a low frequency among a set of operating frequencies, in thickness H1 model and the thickness of model 2 is greater than the model 1, H2>H1.

FIG. 7 shows two lines generated relative to two formation models to attained distances to upper and lower formation boundaries. After the models are found and mapping TVDs are known for two different spacing tools, two lines are used to connect four TVD from long or short spacing with two formation models, as shown in FIG. 7. Since a calculation can produce the coordinates of the cross point of the two connection lines, the two distances to the upper and lower boundaries can be attained.

Figure 8:
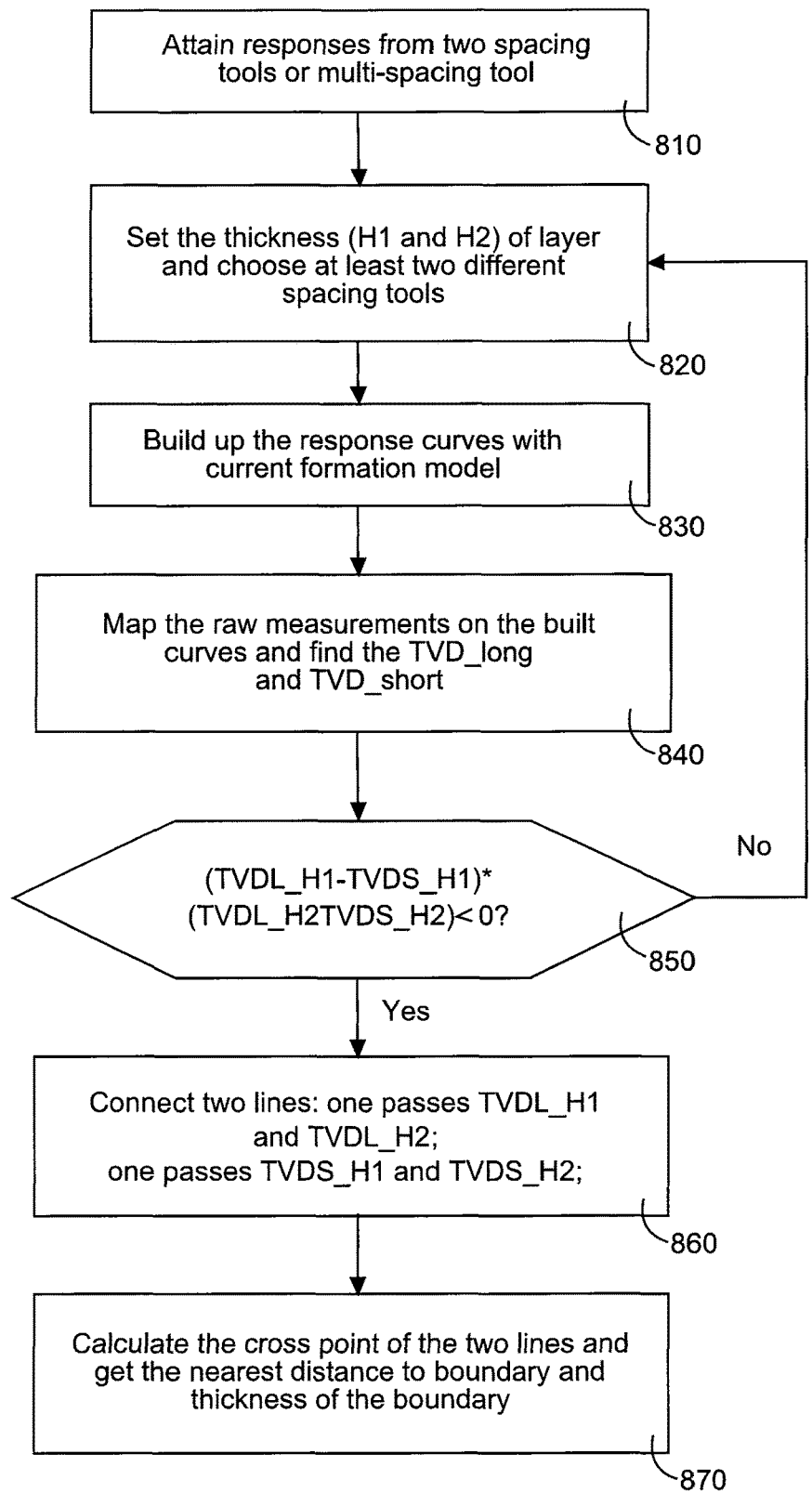
FIG. 8 shows a flow chart of an example workflow to attain distances to boundaries and thickness, in accordance with various embodiments.

FIG. 8 shows a flow chart of an example of a workflow to attain distances to boundaries and thickness. At 810, responses from two spacing tools or a multi-spacing tool are attained. At 820, the thickness (H1 and H2) of layers are set and at least two different spacing of the tools are chosen. At 830, response curves are built up with current formation model. At 840, raw measurements are mapped on the built curves and TVD_long and TVD_short are found. At 850, a determination is made to the query (TVDL_H1−TVDS_H1) *(TVDL_H2−TVDS_H2)<0. If the answer to the query is no, the process moves to 820, where the thickness (H1 and H2) of layers are reset. If the answer to the query is yes, the process moves to 860. At 860, two lines are connected: one line passes through TVDL_H1 and TVDL_H2 and the second line passes through TVDS_H1 and TVDS_H2. At 870, the cross point of the two lines is calculated. This intersection of the two lines provides the value of the nearest distance to a boundary and provides the thickness of the layer between the boundaries.

Procedures similar to or identical to the procedures discussed herein can be the first view of the tool's location and direct field judgments for a drilling operation. The result of these procedures can also provide a good initial guess for a conventional inversion method, which may further provide accurate position information. Although the above discussed procedures are conducted for responses without azimuth rotating, these procedures can be extended to other rotating measurements. In addition to providing a methodology to determine distance to boundaries and thickness using geo-attenuation data, the procedures can be conducted using a geo-phase measurement. Other data can be used in the procedure, if the data is monotonic in the considered range.

In various embodiments, the thickness of a formation layer and nearest boundary distance can be identified in real time without using a conventional iterant inversion method. The estimation of DTBB can be used as the geosteering direction to control a drilling direction.

Various components of a system including a tool, having one or more sensors operable according to a long distance investigation parameter and a short distance investigation parameter, and a processing unit operable to generate a value of a distance to a nearest boundary and a thickness value between two boundaries based on linearization of thickness models, as described herein or in a similar manner, can be realized in combinations of hardware and software based implementations. These implementations may include a machine-readable storage device having machine-executable instructions, such as a computer-readable storage device having computer-executable instructions, to: operate one or more transmitters in a borehole in a formation having a thickness between two boundaries, where the operation can be conducted according to the long distance investigation parameter and the short distance investigation parameter; select two thickness models based on applying responses from operating the one or more transmitters such that the thickness of the formation is between the two thickness models; and generate a value of a distance to a nearest boundary and a thickness value between the two boundaries based on linearization of the two thickness models with respect to the long distance investigation parameter and the short distance investigation parameter. The instructions can include instructions to operate the tool such that the long distance investigation parameter and the short distance investigation parameter can be realized using transmitter-receiver pairs having different spacings between the transmitter and receiver of the respective pairs. The instructions can include instructions to operate the tool such that the long distance investigation parameter and the short distance investigation parameter can be realized by operating one or more transmitters at different frequencies. The instructions can include instructions to operate a tool and a geosteering operation in accordance with the teachings herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

Figure 9:
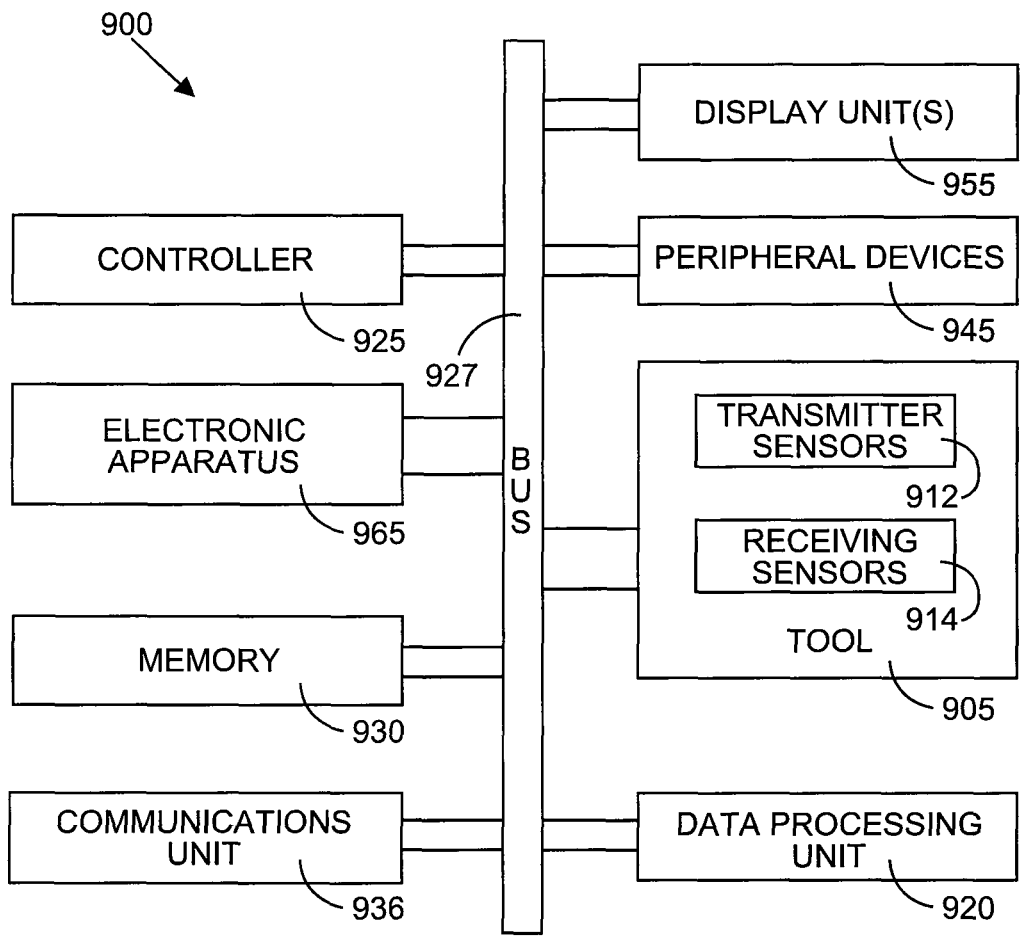
FIG. 9 shows a block diagram of features of an example system having a tool configured with one or more sensors and a processing unit operable to generate a value of a distance to a nearest boundary and a thickness value between two boundaries based on linearization of thickness models, in accordance with various embodiments.

FIG. 9 depicts a block diagram of features of an example embodiment of a system 900 having a tool 905 configured with one or more sensors arranged according to a long distance investigation parameter and a short distance investigation parameter and a processing unit operable to generate a value of a distance to a nearest boundary and a thickness value between two boundaries based on linearization of thickness models, as described herein or in a similar manner. System 900 includes tool 905 having an arrangement of transmitter sensors 912 and receiver sensors 914 that can be realized in a similar or identical manner to arrangements of sensors discussed herein. System 900 can be configured to operate in accordance with the teachings herein.

System 900 can include a controller 925, a memory 930, an electronic apparatus 965, and a communications unit 935. Controller 925, memory 930, and communications unit 935 can be arranged to operate as a processing unit to control operation of tool 905 having an arrangement of transmitter sensors 912 and receiver sensors 914 and to perform one or more linearizations of thickness models based on the signals collected by tool 905 to determine a value of a distance to a nearest boundary and a thickness value between two boundaries of a formation relative to tool 905. The values can be used to geosteer a drilling operation in a manner similar or identical to the procedures discussed herein. A data processing unit 920, to perform one or more linearizations of thickness models based on the signals collected by tool 905 to determine a value of a distance to a nearest boundary and a thickness value between two boundaries of a formation relative to tool 905, can be implemented as a single unit or distributed among the components of system 900 including electronic apparatus 965. Data processing unit 920 can provide data to make course corrections to geosteer to a well.

Controller 925 and memory 930 can operate to control activation of transmitter sensors 912 and selection of receiver sensors 914 in tool 905 and to manage processing schemes in accordance with measurement procedures and signal processing as described herein. Data processing unit 920 can be operated under management of controller 925 and memory 930 downhole or configured as a processing unit at the surface of a well. In various embodiments, controller 925 can be realized as a processor or a group of processors that may operate independently depending on an assigned function. Controller 925, memory 930, data processing unit 920, and/or other components of system 900 can be configured, for example, similar to or identical to the components of tools associated with FIGS. 1-8 and 10 and/or can be configured to operate similar to or identical to methods associated with FIGS. 1-8.

Communications unit 935 can include downhole communications for appropriately located sensors. Such downhole communications can include a telemetry system. Communications unit 935 may use combinations of wired communication technologies and wireless technologies at frequencies that do not interfere with on-going measurements.

System 900 can also include a bus 927, where bus 927 provides electrical conductivity among the components of system 900. Bus 927 can include an address bus, a data bus, and a control bus, each independently configured or in an integrated format. Bus 927 can be realized using a number of different communication mediums that allows for the distribution of components of system 900. Use of bus 927 can be regulated by controller 925.

In various embodiments, peripheral devices 945 can include displays, additional storage memory, and/or other control devices that may operate in conjunction with controller 925 and/or memory 930. Peripheral devices 945 can be arranged with a display, as a distributed component on the surface, that can be used with instructions stored in memory 930 to implement a user interface to monitor the operation of tool 905 and/or components distributed within system 900. The user interface can be used to input parameter values for thresholds such that system 900 can operate autonomously substantially without user intervention. The user interface can also provide for manual override and change of control of system 900 to a user. Such a user interface can be operated in conjunction with communications unit 935 and bus 927.

Figure 10:
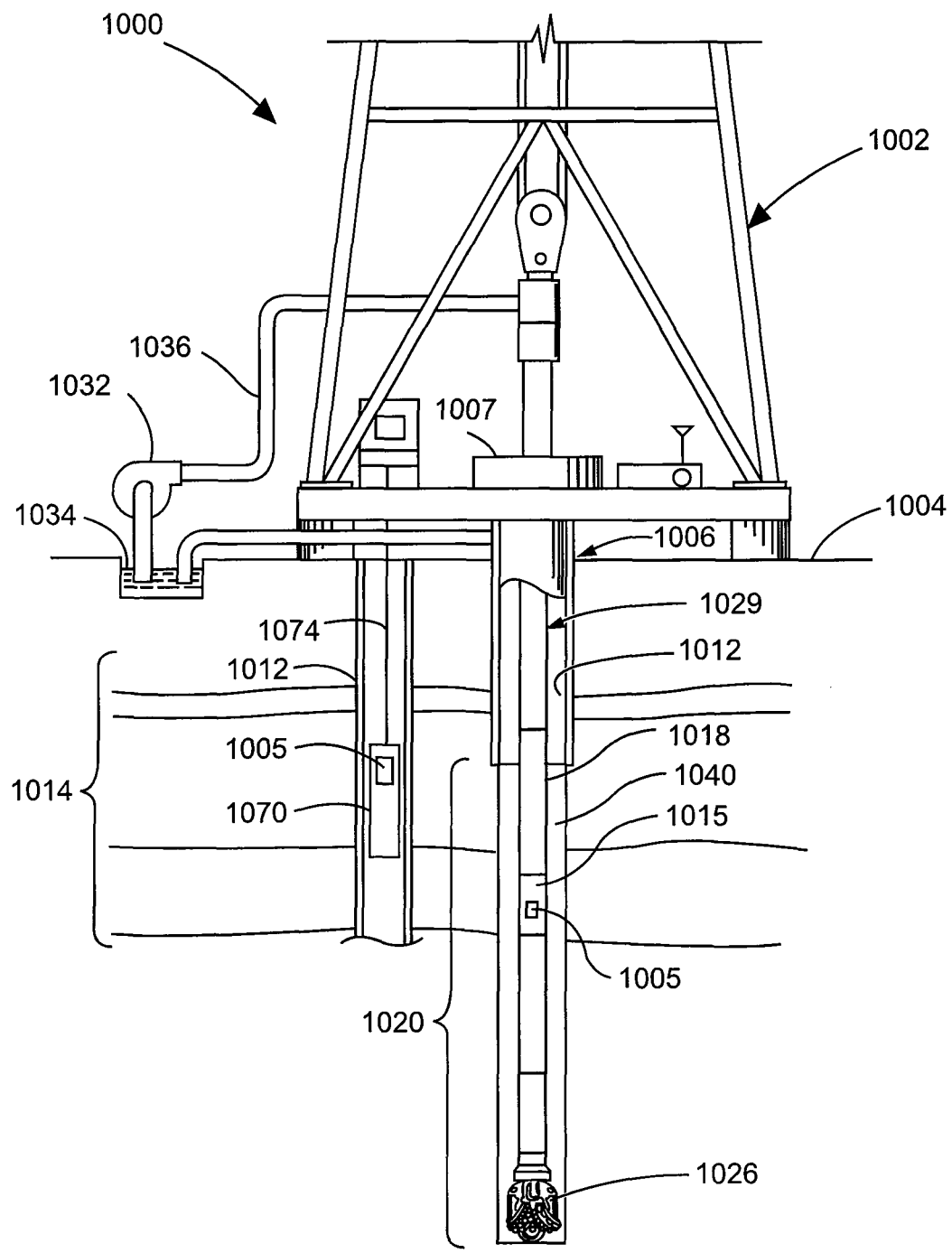
FIG. 10 depicts an example system at a drilling site, where the system includes a tool configured with one or more sensors and a processing unit operable to generate a value of a distance to a nearest boundary and a thickness value between two boundaries based on linearization of thickness models, in accordance with various embodiments.

FIG. 10 depicts an embodiment of a system 1000 at a drilling site, where system 1000 includes a tool 1005 configured with one or more sensors arranged according to a long distance investigation parameter and a short distance investigation parameter and a processing unit operable to generate a value of a distance to a nearest boundary and a thickness value between two boundaries based on linearization of thickness models, as described herein or in a similar manner. System 1000 includes tool 1005 having arrangements of transmitters and receivers that can be realized in a similar or identical manner to arrangements discussed herein. Tool 1005 can be structured and fabricated in accordance with various embodiments as taught herein with respect to a sensor tool having an arrangement of transmitters and receivers, a control unit, a data processing unit, or other components in an integrated structure or distributed arrangement. A distributed arrangement can include components at a surface of well.

System 1000 can include a drilling rig 1002 located at a surface 1004 of a well 1006 and a string of drill pipes, that is, drill string 1018, connected together so as to form a drilling string that is lowered through a rotary table 1007 into a wellbore or borehole 1012. The drilling rig 1002 can provide support for drill string 1018. The drill string 1018 can operate to penetrate rotary table 1007 for drilling a borehole 1012 through subsurface formations 1014. The drill string 1018 can include drill pipe 1029 and a bottom hole assembly 1020 located at the lower portion of the drill pipe 1029.

The bottom hole assembly 1020 can include drill collar 1015, tool 1005 attached to drill collar 1015, and a drill bit 1026. The drill bit 1026 can operate to create a borehole 1012 by penetrating the surface 1004 and subsurface formations 1014. Tool 1005 can be structured for an implementation in the borehole of a well as a measurement while drilling system such as a LWD system. The housing containing tool 1005 can include electronics to activate transmitters of tool 1005 and collect responses from receivers of tool 1005. Such electronics can include a processing unit to analyze signals sensed by tool 1005 and provide measurement results to the surface over a standard communication mechanism for operating a well. Alternatively, electronics can include a communications interface to provide signals sensed by tool 1005 to the surface over a standard communication mechanism for operating a well, where these sensed signals can be analyzed at a processing unit at the surface.

In various embodiments, measurement tool 1005 may be included in a tool body 1070 coupled to a logging cable 1074 such as, for example, for wireline applications. Tool body 1070 containing measurement tool 1005 can include electronics to activate transmitters of measurement tool 1005 and collect responses from receivers of measurement tool 1005. Such electronics can include a data processing unit to analyze signals sensed by measurement tool 1005 and provide measurement results to the surface over a standard communication mechanism for operating a well. Alternatively, electronics can include a communications interface to provide signals sensed by measurement tool 1005 to the surface over a standard communication mechanism for operating a well, where these collected sensed signals are analyzed at a processing unit at the surface. Logging cable 1074 may be realized as a wireline (multiple power and communication lines), a mono-cable (a single conductor), and/or a slick-line (no conductors for power or communications), or other appropriate structure for use in borehole 1012.

During drilling operations, the drill string 1018 can be rotated by the rotary table 1007. In addition to, or alternatively, the bottom hole assembly 1020 can also be rotated by a motor (e.g., a mud motor) that is located downhole. The drill collars 1015 can be used to add weight to the drill bit 1026. The drill collars 1015 also can stiffen the bottom hole assembly 1020 to allow the bottom hole assembly 1020 to transfer the added weight to the drill bit 1026, and in turn, assist the drill bit 1026 in penetrating the surface 1004 and subsurface formations 1014.

During drilling operations, a mud pump 1032 can pump drilling fluid (sometimes known by those of skill in the art as "drilling mud") from a mud pit 1034 through a hose 1036 into the drill pipe 1029 and down to the drill bit 1026. The drilling fluid can flow out from the drill bit 1026 and be returned to the surface 1004 through an annular area 1040 between the drill pipe 1029 and the sides of the borehole 1012. The drilling fluid may then be returned to the mud pit 1034, where such fluid is filtered. In some embodiments, the drilling fluid can be used to cool the drill bit 1026, as well as to provide lubrication for the drill bit 1026 during drilling operations. Additionally, the drilling fluid may be used to remove subsurface formation 1014 cuttings created by operating the drill bit 1026.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   operating one or more transmitters of one or more tools in a borehole in a formation having a thickness between two boundaries, wherein the one or more transmitters are operated according to a first parameter and a second parameter, the first parameter causing investigation at a longer distance in the formation relative to the second parameter;
   selecting a first thickness model based on applying responses from operating the one or more transmitters according to the first parameter and a second thickness model based on applying responses from operating the one or more transmitters according to the second parameter such that a thickness of the formation is between the first and second thickness models;
   generating first estimated values including a distance to a nearest boundary and a thickness between the two boundaries based on linearization of the first and second thickness models with respect to the first parameter and the second parameter; and
   providing the first estimated values as an initial solution to an inversion process for determining second estimated values including a distance to the nearest boundary and a thickness between the two boundaries.

2. A method of claim 1, wherein selecting the first and second thickness models includes selecting the first and second thickness models from a set of more than two thickness models using vertical distances derived from the responses and mapping the vertical distances between thickness models on a pairwise basis with respect to the first parameter and the second parameter.

3. The method of claim 1, wherein generating the first estimated values including the distance to a nearest boundary and the thickness between the two boundaries includes:
   generating a first linear relationship between the first and second thickness models for the first parameter and a second linear relationship between the first and second thickness models for the second parameter; and
   generating the first estimated values including the distance to the nearest boundary and the thickness between the two boundaries from an intersection of the first linear relationship and the second linear relationship.

4. The method of claim 1, wherein operating one or more transmitters includes
   operating the one or more transmitters at a first operating frequency as indicated by the first parameter and at a second operation frequency as indicated by the second parameter such that operating at the first operating frequency generates a long distance of investigation relative to a distance of investigation of operating at the second operation frequency.

5. The method of claim 1, wherein operating one or more transmitters includes operating transmitter-receiver pairs, each transmitter-receiver pair having a spacing between the transmitter and the receiver of the respective pair, at least a first transmitter-receiver pair having a first spacing as indicated by the first parameter and a second transmitter-receiver pair having a second spacing as indicated by the second parameter.

6. The method of claim 5, wherein the method includes:
   generating response curves for two or more formation models of different thicknesses;
   mapping selected responses from operating the one or more transmitters to the response curves and generating a vertical distance for a long spacing and a vertical distance for a short spacing for each model thickness;
   determining two models corresponding to two different selected spacings such that the thickness is between the thicknesses of the two models, the two different selected spacings being a selected first spacing and a selected second spacing; and
   calculating a cross point of a first line with a second line, the first line generated by a vertical distance for the selected first spacing of one of the two models and a vertical distance for the selected first spacing of the other one of the two models, the second line generated by a vertical distance for the selected second spacing of one of the two models and a vertical distance for the selected second spacing of the other one of the two models; and
   generating third estimated values including a distance to the nearest boundary and a thickness between the two boundaries value of the formation from coordinates of the cross point.

7. The method of claim 1, wherein the method includes geosteering a drilling operation based on the generated value.

8. The method of claim 1, wherein the method includes operating the one or more transmitters and operating electronics on a logging while drilling tool, the electronics arranged to select the first and second thickness models based on applying responses from operating the one or more transmitters and to generate the first estimated values of the distance to a nearest boundary and the thickness between the two boundaries.

9. The method of claim 1, wherein selecting the first and second thickness models based on applying responses from operating the one or more transmitters includes using geo-attenuation data from operating the one or more transmitters.

10. The method of claim 1, wherein selecting the first and second thickness models based on applying responses from operating the one or more transmitters includes using geo-phase data from operating the one or more transmitters.

11. A non-transitory machine-readable storage device having instructions stored thereon, which, when performed by a machine, cause the machine to perform operations, the operations comprising:

operating one or more transmitters of one or more tools in a borehole in a formation having a thickness between two boundaries, wherein the one or more transmitters are operated according to a first parameter and a second parameter, the first parameter causing investigation at a longer distance in the formation relative to the second parameter;

selecting a first thickness model based on applying responses from operating the one or more transmitters according to the first parameter and a second thickness model based on applying responses from operating the one or more transmitters according to the second parameter such that a thickness of the formation is between the first and second thickness models;

generating first estimated values including a distance to a nearest boundary and a thickness between the two boundaries based on linearization of the first and second thickness models with respect to the first parameter and the second parameter; and providing the first estimated values as an initial solution to an inversion process for determining second estimated values including a distance to the nearest boundary and a thickness between the two boundaries.

12. A system comprising:

a tool structure having a first transmitter-receiver pair set apart by a first separation distance and a second transmitter-receiver pair set apart by a second separation distance, wherein the first separation distance is greater than the second separation distance;

a data processing unit; and a machine-readable storage device having instructions executable by the data processing unit to cause the system to:

operate the first and second transmitter-receiver pairs in a borehole in a formation having a thickness between two boundaries;

select a first thickness models based on application of responses from operation of the first transmitter-receiver pair and a second thickness model based on application of responses from operation of the second transmitter-receiver pair such that a thickness of the formation is between the first and second thickness models;

generate first estimated values including a distance to a nearest boundary and a thickness between the two boundaries based on linearization of the first and second thickness models with respect to the first separation distance and the second separation distance; and provide the first estimated values as an initial solution to an inversion process for determining second estimated values including a distance to the nearest boundary and a thickness between the two boundaries.

13. The system of claim 12, wherein to select the first and second thickness models includes selection of the first and second thickness models from a set of more than two thickness models from use of vertical distances derived from the responses and a mapping of the vertical distances between thickness models on a pairwise basis with respect to the first separation distance and the second separation distance.

14. The system of claim 12, wherein to generate the first estimated values including the distance to a nearest boundary and the thickness between the two boundaries includes:

generation of a first linear relationship between the first and second thickness models for the first separation distance and a second linear relationship between the first and second thickness models for the second separation distance; and generation of the first estimated values including the distance to the nearest boundary and the thickness between the two boundaries from an intersection of the first linear relationship and the second linear relationship.

15. The system of claim 12, wherein operation of the first and second transmitter-receiver pairs includes operation of the first and second transmitter-receiver pairs at a first operating frequency and at a second operation frequency such that operating at the first operating frequency generates a long distance of investigation relative to a distance of investigation of operating at the second operation frequency.

16. The system of claim 12, wherein the machine-readable storage device further has instructions to:

generate response curves for two or more formation models of different thicknesses;

map selected responses from operating the first and second transmitter-receiver pairs to the response curves and generating a vertical distance for a long spacing and a vertical distance for a short spacing for each model thickness;

determine two models corresponding to two different selected spacings such that the thickness is between the thicknesses of the two models, the two different selected spacings being a selected first spacing and a selected second spacing; and calculate a cross point of a first line with a second line, the first line generated by a vertical distance for the selected first spacing of one of the two models and a vertical distance for the selected first spacing of the other one of the two models, the second line generated by a vertical distance for the selected second spacing of one of the two models and a vertical distance for the selected second spacing of the other one of the two models; and generate the first estimated values including the distance to the nearest boundary and the thickness between the two boundaries from coordinates of the cross point.

17. The system of claim 12, wherein the tool structure and the data processing unit are structured to geosteer a drilling operation based on the generated value.

18. The system of claim 12, wherein the tool structure and the data processing unit are structured to operate the first and second transmitter-receiver pairs and operate electronics on a logging while drilling tool, the electronics arranged to select the first and second thickness models based on applying responses from operating the first and second transmitter-receiver pairs and to generate the first estimated values including the distance to a nearest boundary and the thickness between the two boundaries.

19. The system of claim 12, wherein to select the first and second thickness models based on application of responses from operation of the first and second transmitter-receiver pairs includes use of geo-attenuation data from operation of the first and second transmitter-receiver pairs.

20. The system of claim 12, wherein to select the first and second thickness models based on application of responses from operation of the first and second transmitter-receiver pairs includes use of geo-phase data from operation of the first and second transmitter-receiver pairs.

21. The non-transitory machine-readable storage device of claim 11, wherein selecting the first and second thickness models includes selecting the first and second thickness models from a set of more than two thickness models using vertical distances derived from the responses and mapping the vertical distances between thickness models on a pair-wise basis with respect to the first parameter and the second parameter.

22. The non-transitory machine-readable storage device of claim 11, wherein generating the first estimated values including the distance to a nearest boundary and the thickness between the two boundaries includes:
generating a first linear relationship between the first and second thickness models for the first parameter and a second linear relationship between the first and second thickness models for the second parameter; and
generating the first estimated values including the distance to the nearest boundary and the thickness between the two boundaries from an intersection of the first linear relationship and the second linear relationship.

23. The non-transitory machine-readable storage device of claim 11, wherein operating one or more transmitters includes operating the one or more transmitters at a first operating frequency as indicated by the first parameter and at a second operation frequency as indicated by the second parameter such that operating at the first operating frequency generates a long distance of investigation relative to a distance of investigation of operating at the second operation frequency.

24. The non-transitory machine-readable storage device of claim 11, wherein operating one or more transmitters includes operating transmitter-receiver pairs, each transmitter-receiver pair having a spacing between the transmitter and the receiver of the respective pair, at least a first transmitter-receiver pair having a first spacing as indicated by the first parameter and a second transmitter-receiver pair having a second spacing as indicated by the second parameter.

25. The non-transitory machine-readable storage device of claim 24, wherein the operations include:
generating response curves for two or more formation models of different thicknesses;
mapping selected responses from operating the one or more transmitters to the response curves and generating a vertical distance for a long spacing and a vertical distance for a short spacing for each model thickness;
determining two models corresponding to two different selected spacings such that the thickness is between the thicknesses of the two models, the two different selected spacings being a selected first spacing and a selected second spacing; and
calculating a cross point of a first line with a second line, the first line generated by a vertical distance for the selected first spacing of one of the two models and a vertical distance for the selected first spacing of the other one of the two models, the second line generated by a vertical distance for the selected second spacing of one of the two models and a vertical distance for the selected second spacing of the other one of the two models; and
generating third estimated values including the distance to the nearest boundary and a thickness between the two boundaries from coordinates of the cross point.

26. The non-transitory machine-readable storage device of claim 11, wherein the operations include geosteering a drilling operation based on the generated value.

27. The non-transitory machine-readable storage device of claim 11, wherein the operations include operating the one or more transmitters and operating electronics on a logging while drilling tool, the electronics arranged to select the first and second thickness models based on applying responses from operating the one or more transmitters and to generate the first estimated values including the distance to a nearest boundary and the thickness between the two boundaries.

28. The non-transitory machine-readable storage device of claim 11, wherein selecting the first and second thickness models based on applying responses from operating the one or more transmitters includes using geo-attenuation data from operating the one or more transmitters.

29. The non-transitory machine-readable storage device of claim 11, wherein selecting the first and second thickness models based on applying responses from operating the one or more transmitters includes using geo-phase data from operating the one or more transmitters.

* * * * *